United States Patent
Kennedy et al.

(10) Patent No.: US 7,519,461 B2
(45) Date of Patent: Apr. 14, 2009

(54) DISCRIMINATE INPUT SYSTEM FOR DECISION ALGORITHM

(75) Inventors: Karl R. Kennedy, Fraser, MI (US); Christopher Ricard, Rochester, MI (US); John Nathan, White Lake, MI (US)

(73) Assignee: Lear Corporation, Southfield, MI (US)

( * ) Notice: Subject to any disclaimer, the term of this patent is extended or adjusted under 35 U.S.C. 154(b) by 373 days.

(21) Appl. No.: 11/163,875

(22) Filed: Nov. 2, 2005

(65) Prior Publication Data

US 2007/0100528 A1    May 3, 2007

(51) Int. Cl.
*B60R 22/00* (2006.01)
(52) U.S. Cl. .................... 701/45; 340/665
(58) Field of Classification Search ............ 701/45; 340/665–666; 280/734–735, 728.1, 801.1, 280/802; 180/271, 273, 290; 706/14–15, 706/20
See application file for complete search history.

(56) References Cited

U.S. PATENT DOCUMENTS

| | | | | |
|---|---|---|---|---|
| 6,605,877 B1 * | 8/2003 | Patterson et al. | ............ | 307/10.1 |
| 6,609,054 B2 * | 8/2003 | Wallace | ............... | 701/45 |
| 6,644,689 B2 * | 11/2003 | Murphy | ............... | 280/735 |
| 6,697,723 B2 * | 2/2004 | Olsen et al. | ............ | 701/45 |
| 7,026,946 B2 * | 4/2006 | Saunders et al. | ............ | 340/666 |
| 7,353,088 B2 * | 4/2008 | Eagen et al. | ............ | 701/1 |
| 2004/0250633 A1 | 12/2004 | Lin | | |
| 2005/0149284 A1 | 7/2005 | Nathan et al. | | |

* cited by examiner

*Primary Examiner*—Dalena Tran

(57) ABSTRACT

A method for discriminating input to a sensing algorithm used with an occupancy classification system includes generating a series of sensor signals from a sensor array. The method further includes generating a sensor signal from a belt tension sensor and generating a pattern recognition algorithm as a function of: the series of sensor signals from the sensor array and the sensor signal from the belt tension sensor.

18 Claims, 2 Drawing Sheets

DISCRIMINATE INPUT SYSTEM FOR DECISION ALGORITHM

TECHNICAL FIELD

The present invention relates generally to vehicle occupant identification systems and, more specifically, to a method for analyzing a seat occupant as part of a supplemental restraint system.

BACKGROUND OF THE INVENTION

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to control selectively the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds those required to restrain smaller occupants, such as some females and small children. Thus, there existed a recognized need in the art for occupant sensing systems that could be used to control selectively the deployment of the airbags when a person below a predetermined weight occupied the seat.

Accordingly, other vehicle safety systems have been proposed that are capable of detecting the weight of an occupant. In one such air bag system, if the occupant's weight falls below a predetermined level, then the system can suppress the inflation of the air bag or prevent the air bag from deploying. This reduces the risk of injury that the inflating air bag could otherwise cause to a smaller-sized occupant.

Also, many airbag deployment forces and speeds have generally been optimized to restrain a person sitting generally upright and towards the back of the seat. However, airbag deployment force and speed may inappropriately restrain a person sitting otherwise. Thus, there became a recognized need in the art for a way to control selectively the deployment of an airbag depending on the occupants sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively for reducing injuries to vehicle occupants.

One necessary component of each of the known systems discussed above includes some means for sensing the presence of the vehicle occupant in the seat. One such means may include a sensor device supported within the lower seat cushion of the vehicle seat, generating an output indicating the presence of an occupant in the seat.

Additionally, a number of occupancy sensing systems known in the related art teach the use of sensing processes that employ artificial neural networks (ANN). ANNs are more commonly referred to as neural networks, or simply, neural nets. The term neural net (NN) is in fact a broad term that includes many diverse models and approaches. However, the basic structure of all NNs draws a loose analogy to the parallel interconnectivity of the neurons of the human brain. In general terms, a NN is essentially an interconnected assembly of simple processing element units, or nodes. The processing ability of the network is stored in the inter-unit connection strengths, or weights, obtained by a process of adaptation to or learning from, a set of training patterns. The NN may simply have an input and an output layer of units or may have an additional "hidden" layer or layers of units that internally direct the interconnection processes. The benefit of employing a NN approach is that, if properly trained, the NN will be able to generalize and infer the correct output responses from limited input data. This not only allows the NN based occupancy sensing systems to comply with the current federal standards, but it may also allow these systems to be refined for extending their capabilities of distinguishing between a wide variety of occupants seated in a variety of positions.

Generally speaking, if it is desired to use a NN to produce particular results from a variety of possible inputs, the NN must first be trained to understand the data it will receive. In this case, the NN is provided an input and the desired result. This training process is known as "supervised learning." Supervised learning may be applied to a number of different known types of NNs, but when used for pattern recognition, as in determining the occupancy of a vehicle seat, a "clustering" type of NN is more accurate and efficient. Clustering NNs develop a set of "codebook vectors" that define a set of output clusters or classes. During the training of a clustering NN, the NN defines and "learns" the boundaries between its established clusters. The NN employs a "learning" rule whereby the weights of the unit connections are adjusted on the basis of the training data. The learning rule is essentially the algorithm used in the NN that will be the basis for deciding how to classifying the actual incoming data once the training is completed and the NN is put into use.

For a clustering NN to perform pattern recognition and classification of a physical presence that occupies a vehicle seat, a group of sensors arranged in an array are used to collect the raw input data. Since NNs operate digitally and the data derived from the sensor array is analog, the data must be converted to a representative digital signal for input to the NN. Typically, extensive filtering is required to compensate for shortcomings in the array or to prepare the data to work with the particular type of NN employed.

However, with NNs, overlapping of sensor data muddles the distinction of one pattern from another in certain weight ranges. This may result in inaccurate interpretation of the sensor data and possible mis-classification of the occupant.

Accordingly, there remains a need in the art for a method of discriminating occupant characteristics without adding a significant number of sensors to the system. There further remains in the art a need to override a NN in the case where the NN incorrectly classifies a seat occupant. The present invention is directed to these ends.

SUMMARY OF THE INVENTION

The disadvantages of the related art are overcome by the method for discriminating input to a sensing algorithm used with an occupancy classification system. The method includes generating a series of sensor signals from a sensor array, generating a sensor signal from a belt tension sensor, and generating a pattern recognition algorithm as a function of the series of sensor signals from the sensor array and the sensor signal from the belt tension sensor.

Thus, the present invention provides the advantage of allowing more clear discrimination of child safety seats and live occupants. A further advantage of the present invention is that does not require a significant number of additional sensors.

Other objects, features and advantages of the present invention will be readily appreciated, as the same becomes better understood after reading the subsequent description taken in connection with the accompanying drawings. The present invention itself, together with further objects and attendant advantages, will be best understood by reference to the following detailed description, taken in conjunction with the accompanying drawings.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

While the present invention is described primarily with respect to a discriminate input system for a decision algorithm for an automotive vehicle, the present invention may be adapted to various applications requiring discriminate input systems, as will be understood by one skilled in the art.

In the following description, various operating parameters and components are described for a number of constructed embodiments. The specific parameters and components are included as examples and are not meant to be limiting.

Figure 1:
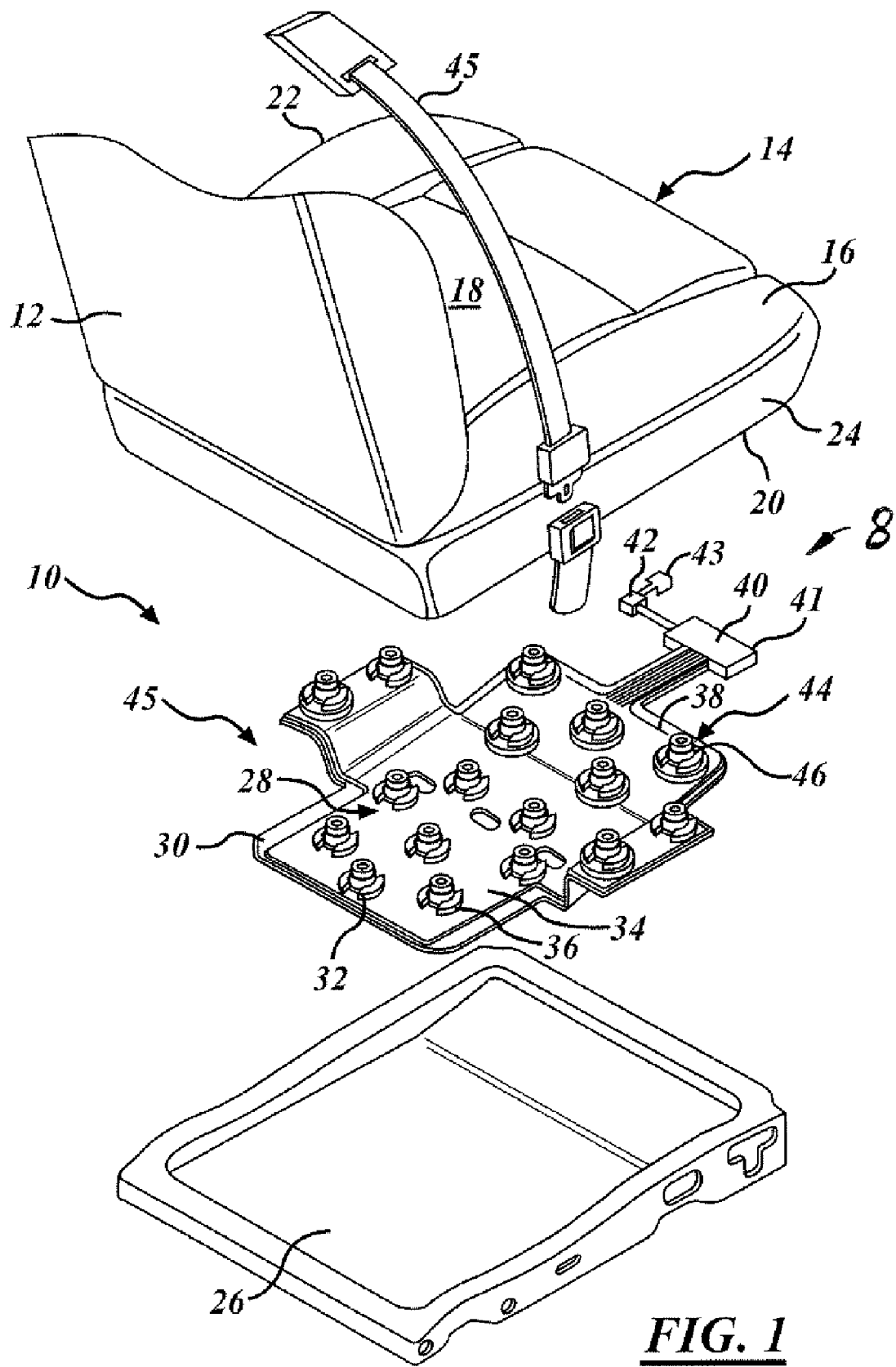
FIG. 1 is an exploded view of a vehicle seat having a plurality if sensors in accordance with one embodiment of the present invention.

Referring now to the drawings, like numerals are used to designate like structure throughout the figures. Referring to FIG. 1, an exploded view of one example of a vehicle seat assembly (for a vehicle, which is not shown) having an occupancy classification system 8 or occupancy sensing system (discussed in detail regarding FIG. 2) that may be employed with the method of the present invention is generally indicated at 10. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The seat cushion 16 also defines an inboard side 22 and an outboard side 24. When an occupant (not shown) is supported on the lower seat assembly 14, the weight of the occupant applies an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle (not shown) using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

One embodiment of the occupant sensing system 28 includes a circuit carrier tray, generally indicated at 30, supported by the seat pan 26. The circuit carrier tray 30 includes a plurality of resilient attachment tabs 32 extending upward toward the lower surface 20 of the lower seat cushion 16. The tray 30 supports components of the vehicle occupant sensing system.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. The circuit 38 is electrically connected to a controller system schematically illustrated at 40. The electric circuit 38 carries electric signals generated by the vehicle occupant sensing system 28 to the controller system 40. The controller system 40 is electrically attached to a restraint system, schematically illustrated at 42. The restraint system 42 can be of many types, such as an air bag system, and the controller system 40 controls the restraint system 42 based on the signals delivered by the electric circuit 38. Although an airbag restraint system is discussed here, one having ordinary skill in the art will recognize that the type of restraint system 42 connected to the controller system 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45.

A sensor, generally indicated at 46, is operatively fixed relative to each of the low profile sensor assemblies 32. The sensor 46 is in electrical communication with the electric circuit 38.

In this manner, the sensor array assembly 45, through the combined output of the sensors 46 forms a portion of a vehicle seat occupancy sensing system that is associated with the supplemental restrain system (SRS) 42.

The sensor array assembly 45 may also include a seatbelt tension sensor 43 generating pressure signals as a function of use of the seatbelt 45. The seatbelt tension sensor 43, however, is described herein in a different embodiment as separate from the sensor array assembly 45. Further, the seatbelt tension sensor may generate a discrete (0/1) or analog signal.

The sensor array assembly 45 and the seatbelt tension sensor 43 are utilized to provide data to the controller system 40 of the SRS. This is generally referred to herein as the sensing algorithm. The SRS controller system 40 may employ a neural net (NN) 41. In this case, the controller system 40 uses the pattern generated by the sensor array 45 and the belt tension sensor 43, based on the occupancy of the vehicle seats as recognized by the NN, to activate or suppress the deployment of the airbags. This is generally referred to herein as the pattern recognition algorithm.

More specifically, when a physical presence occupies the vehicle seat, the collective sensor outputs of the sensors 46 in the sensor array 45 and the belt tension sensor 43 produce a particular pattern that the NN recognizes as belonging to a certain group of patterns (i.e. a cluster or classification). If the pattern is one that falls into a classification predetermined thereby to be desirable to deploy the airbag in the event of an impact, the SRS controller system 40 will be prepared therefor. If the pattern is one that falls into a classification that it has been predetermined as not desirable to deploy the airbag in the event of an impact, the SRS controller system 40 will take steps to suppress the deployment. Furthermore, the classification of the recognized pattern also provides the SRS controller system 40 with the capability to control the rate and percentage of airbag deployment if the SRS system is so designed.

It should be appreciated that the basic classifications of occupants used herein are those established in the industry through governmental regulation, and that the present invention is not limited only to those class distinctions but is fully capable of identifying and distinguishing a far greater separation of occupant classes as may be required in the future.

Figure 2:
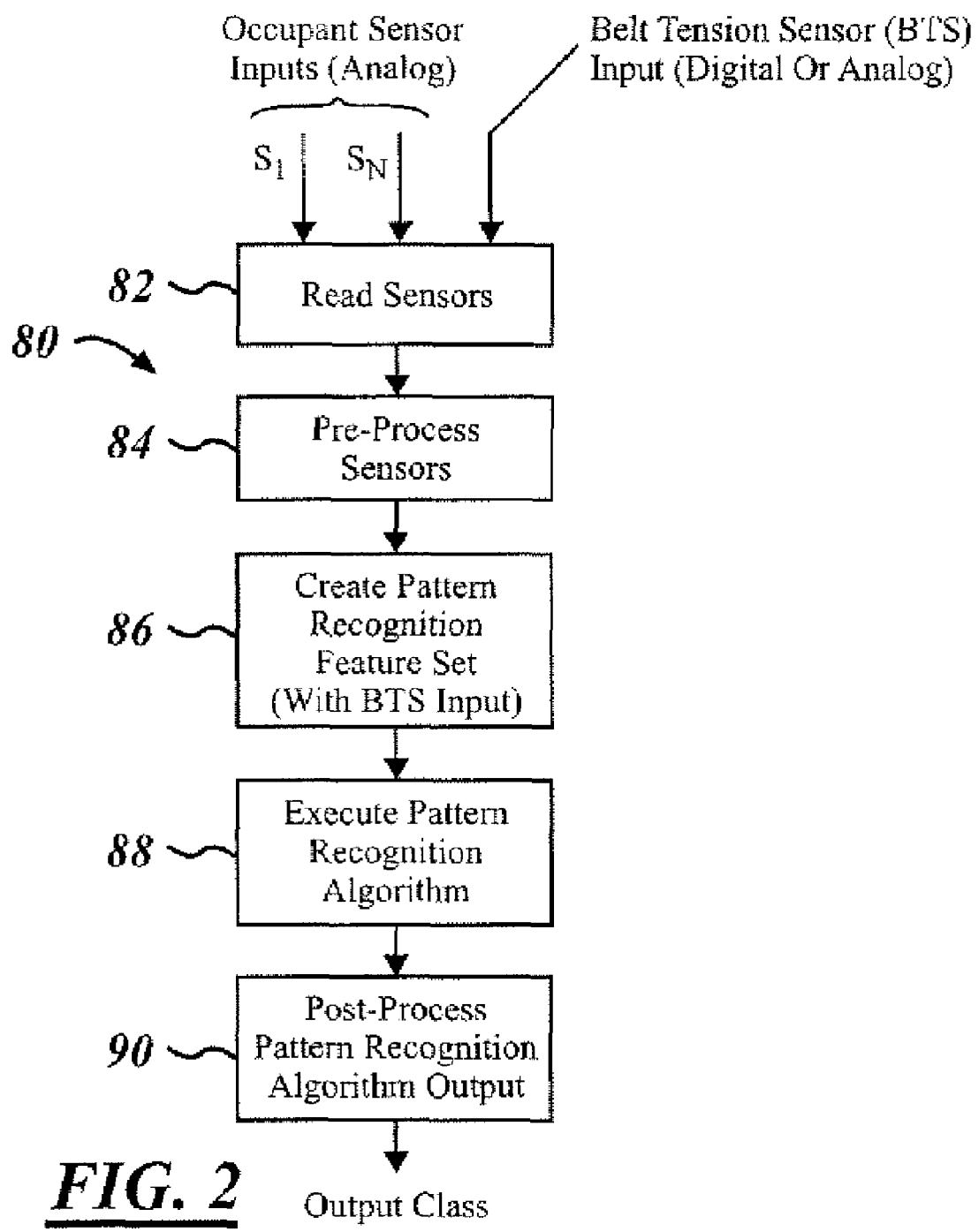
FIG. 2 is a logic flow diagram of the method of the present invention in accordance with another embodiment of the present invention.

Referring to FIG. 2, a logic flow diagram 80 illustrating a method for discriminating input for a decision algorithm is illustrated in accordance with one embodiment of the present invention. The present logic may be engaged within the controller system 40 or the NN or a combination thereof. Logic starts in operation block 82 where the sensors are read or sensor data is received in the controller system. The sensors may include the sensor array (occupant sensors) $S_1$ through $S_N$ (e.g. the sensor array) and the seatbelt tension sensor input.

In operation block 84, the sensor inputs received in operation block 82 are pre-processed. Pre-processing may include offset adjustment or other manipulation of sensor data for making the data more workable within software of the present invention.

In operation block 86, a pattern recognition feature set is generated as a function of the sensor array data and the belt tension sensor data. The belt tension sensor data may be used to override the neural net and provide a predetermined output. The neural net is overridden is situations where, for example, the belt tension sensor senses greater then normal tension indicating a child seat is buckled in as opposed to an adult passenger. Normally, tightly belted child seats can provide signals resembling normal occupant signals. The addition of the belt tension sensor data resolves any pattern or sum overlap that may exist between tightly belted child seats and live occupants.

In an alternate embodiment, the belt tension sensor data may also be used as an additional spatial vector to the neural net for generating the pattern recognition feature set.

In operation block 88, the pattern recognition algorithm is executed.

In operation block 90, output from operation block 88 is post-processed, which may include filtering the data. For example, the output data may be compared to the last ten samples, in the case where nine of the last ten samples match, the non-matching output is overruled. The classification signal is outputted from operation block 90.

Referring to FIG. 3, a method for sensing an occupant for input into the NN is illustrated in accordance with one embodiment of the present invention. The method is initiated at the start entry block 202. Process block 204 then provides the step of forming a sensor array 45. The sensor array 45 is first formed by arranging the plurality of sensor assemblies 44 under the seat cushion form. It should be appreciated that the initial choice of a particular number of sensor assemblies 44 is somewhat arbitrary and will differ depending on the size of the seat or on other physical properties inherent in the seat components. It should also be appreciated that, as will be discussed below, the method of the present invention will assist the seat designer to determine if additional sensors are needed to detect properly and identify the set occupancy or if some sensors are redundant.

In FIG. 1, since this portion of the method of the present invention provides a discriminate input system for a decision algorithm for generating the output of a seat sensor array and seatbelt sensor for a vehicle seat used with a neural net, the array and seatbelt sensor must be electrically connected to the NN. It should be appreciated that, although beyond the scope of this invention, it is necessary that some type of interface be established between the array, the seatbelt sensor, and the NN, so that the analog or digital data derived from the array and belt tension sensor can be preprocessed to provide digital information in the form that is understandable by the NN. Further, the data must be understandable as a series of representative seat occupancy patterns to the NN.

In this manner, using a system having a sensor array and a discriminate input system for a decision algorithm, the SRS system will operationally be capable of distinctly determining a physical presence in a vehicle seat as belonging to a particular occupancy classification. Thus, the method of the present invention overcomes the drawbacks and the limitations of the prior art by providing a discriminate input system for a decision algorithm for a sensor array used with a NN in a system allowing the NN to distinguish between all the various occupant classifications.

In operation, a method for discriminating input to a sensing algorithm used with the output of a sensor array and a seatbelt tension sensor for a vehicle seat occupancy sensing system used with a neural net for occupancy classification includes the steps of buckling at least one of a passenger and a safety seat into a particular vehicle seat with a seatbelt; generating a series of sensor response signals from the sensor array and the belt tension sensor in response to pressure on the vehicle seat and tension on the seatbelt; comparing each sensor response signal through the neural net; and generating a classification signal in the neural net as a function of the response signals indicating that the tension on the seatbelt exceeds a predetermined threshold, and therefore the safety seat occupies the vehicle seat.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method for discriminating input to a sensing algorithm used with an occupancy classification system, said method including the steps of: generating a series of occupant sensor signals from a sensor array; generating a sensor signal from a belt tension sensor; and generating a pattern recognition algorithm as a function of said series of sensor signals from said sensor array and said sensor signal from said belt tension sensor; wherein generating said pattern recognition algorithm comprises analyzing said series of sensor signals from said sensor array and said sensor signal from said belt tension sensor in a neural net.

2. The method of claim 1 further comprising pre-processing said series of occupant sensor signals from said sensor array and said sensor signal from said belt tension sensor prior to generation of said pattern recognition algorithm.

3. The method of claim 2, wherein pre-processing comprises adjusting sensor offsets for generating signals workable within software limitations.

4. The method of claim 1 further comprising post-processing output from said pattern recognition algorithm.

5. The method of claim 4, wherein said post-processing comprises filtering said output.

6. The method of claim 4, wherein said post-processing comprises overruling a non-matching output relative to a series of matching outputs.

7. The method of claim 1, wherein generating said sensor signal from said belt tension sensor comprises generating at least one of a high tension signal indicating a seatbelt is tightly applied to an occupant or and a low tension signal indicating that said seatbelt is normally applied to said occupant.

8. The method of claim 7, wherein said high tension signal indicates a child safety seat is buckled by said seatbelt.

9. The method of claim 1, wherein generating said pattern recognition algorithm comprises ignoring said series of occupant sensor signals from said sensor array in response to said sensor signal from said belt tension sensor indicating tension corresponding with a safety seat.

10. The method of claim 9, further comprising generating said pattern recognition in a neural net, whereby said step of ignoring comprises overriding output of said neural net and providing a predetermined output as said pattern recognition.

11. A method for discriminating input to a sensing algorithm used with the output of a sensor array from the vehicle occupant sensors and a seatbelt tension sensor for a vehicle seat occupancy sensing system used with a neural net for occupancy classification, said method including the steps of: buckling at least one of a passenger and a safety seat into a particular vehicle seat with a seatbelt; generating a series of occupant sensor response signals from the sensor array and the belt tension sensor in response to pressure on said vehicle seat and tension on said seatbelt; comparing each sensor response signal from the vehicle occupant sensors and the seatbelt tension sensors through the neural net; and generating a classification signal in said neural net as a function of said response signals indicating that said tension on said seatbelt exceeds a predetermined threshold, and therefore said safety seat occupies said vehicle seat.

12. The method of claim 11 further comprising pre-processing said series of sensor response signals from said sensor array and said belt tension sensor prior to comparing each sensor response signal through the neural net.

13. The method of claim 12, wherein pre-processing comprises adjusting sensor offsets for generating signals workable within software limitations.

14. The method of claim 11 further comprising post-processing said classification signal.

15. The method of claim 14, wherein said post-processing comprises overruling a non-matching output relative to a series of matching outputs.

16. The method of claim 11, wherein generating said pattern recognition in said neural net comprises overriding output of said neural net and providing a predetermined output as said classification signal.

17. An occupant classification system for a vehicle having a vehicle seat having vehicle occupant sensors associated therewith, a seatbelt for belting in a seat occupant having a belt tension sensor measuring tension thereof, said occupant classification system comprising: a controller comprising logic generating a series of sensor signals from the occupant sensors; generating a sensor signal from the belt tension sensor; and generating a pattern recognition algorithm as a function of said series of sensor signals from the occupant sensors and said sensor signal from the belt tension sensor; wherein generating said pattern recognition algorithm comprises analyzing said series of sensor signals from the vehicle occupant sensors and said sensor signal from the belt tension sensor in a neural net.

18. The system of claim 17, wherein generating said pattern recognition algorithm comprises ignoring said series of sensor signals from the vehicle occupant sensors in response to said sensor signal from said belt tension sensor indicating tension corresponding to that typically encountered with a safety seat in the vehicle seat.

* * * * *